United States Patent
Akutagawa et al.

(10) Patent No.: US 8,605,813 B2
(45) Date of Patent: Dec. 10, 2013

(54) TRANSMITTER

(75) Inventors: Hiroyuki Akutagawa, Tokyo (JP); Takashi Kajiyama, Tokyo (JP); Takehiko Kobayashi, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 13/579,387

(22) PCT Filed: Feb. 25, 2011

(86) PCT No.: PCT/JP2011/001110
§ 371 (c)(1),
(2), (4) Date: Aug. 16, 2012

(87) PCT Pub. No.: WO2011/105103
PCT Pub. Date: Sep. 1, 2011

(65) Prior Publication Data
US 2012/0314800 A1 Dec. 13, 2012

(30) Foreign Application Priority Data
Feb. 26, 2010 (JP) ................... 2010-041617

(51) Int. Cl.
*H04L 27/00* (2006.01)
(52) U.S. Cl.
USPC ........................................ 375/295
(58) Field of Classification Search
USPC ............... 375/302, 260, 295, 324, 299
See application file for complete search history.

(56) References Cited

U.S. PATENT DOCUMENTS

2006/0056539 A1* 3/2006 Nam et al. ............. 375/299
2010/0284480 A1* 11/2010 Jia et al. ............. 375/260

FOREIGN PATENT DOCUMENTS

| JP | 8-307473 | 11/1996 |
| JP | 2003-23468 | 1/2003 |
| JP | 2009-303086 | 12/2009 |

OTHER PUBLICATIONS

Japanese Notification of Reasons for Refusal (with English translation) issued Jan. 25, 2011 in corresponding Japanese Patent Application No. 2010-041617.
International Search Report issued May 17, 2011 in International (PCT) Application No. PCT/JP2011/001110.

* cited by examiner

*Primary Examiner* — Jaison Joseph
(74) *Attorney, Agent, or Firm* — Wenderoth, Lind & Ponack, LLP (57) ABSTRACT

In a transmitter, communication is efficiently performed by a DSTBC scheme.
In a transmitter which transmits a signal using the DSTBC scheme, the content of a transmission process is set so that a state where a symbol is not present is realized at the origin of signal arrangement in a DSTBC encoder. As an example, the setting is performed so that an input to the DSTBC encoder is calculated using a predetermined operation in which a state where a symbol is not present is realized at the origin of signal arrangement in the DSTBC encoder. As another example, the setting is performed so that initial values in which a state where a symbol is not present is realized at the origin of signal arrangement in the DSTBC encoder are used in differential encoding of the DSTBC encoder.

6 Claims, 7 Drawing Sheets

(c)
COORDINATE

| No | COORDINATE | GENERALIZATION |
|---|---|---|
| 1 | $S = \sin(\pi/8)\{\cos(\pi/8)+j \cdot \sin(\pi/8)\}$ | ① |
| 2 | $S = \sin(\pi/8)\{\cos(3\pi/8)+j \cdot \sin(3\pi/8)\}$ | $S = \sin(\pi/8)e^{j(2k+1)\pi/8}$ |
| 3 | $S = \sin(\pi/8)\{\cos(5\pi/8)+j \cdot \sin(5\pi/8)\}$ | |
| 4 | $S = \sin(\pi/8)\{\cos(7\pi/8)+j \cdot \sin(7\pi/8)\}$ | |
| 5 | $S = \sin(\pi/8)\{\cos(9\pi/8)+j \cdot \sin(9\pi/8)\}$ | |
| 6 | $S = \sin(\pi/8)\{\cos(11\pi/8)+j \cdot \sin(11\pi/8)\}$ | |
| 7 | $S = \sin(\pi/8)\{\cos(13\pi/8)+j \cdot \sin(13\pi/8)\}$ | |
| 8 | $S = \sin(\pi/8)\{\cos(15\pi/8)+j \cdot \sin(15\pi/8)\}$ | |
| 9 | $S = \sin(\pi/4)\{\cos(0) + j \cdot \sin(0)\}$ | ② |
| 10 | $S = \sin(\pi/4)\{\cos(\pi/4)+j \cdot \sin(\pi/4)\}$ | $S = \sin(\pi/4)e^{jk\pi/4}$ |
| 11 | $S = \sin(\pi/4)\{\cos(\pi/2)+j \cdot \sin(\pi/2)\}$ | |
| 12 | $S = \sin(\pi/4)\{\cos(3\pi/4)+j \cdot \sin(3\pi/4)\}$ | |
| 13 | $S = \sin(\pi/4)\{\cos(\pi)+j \cdot \sin(\pi)\}$ | |
| 14 | $S = \sin(\pi/4)\{\cos(5\pi/4)+j \cdot \sin(5\pi/4)\}$ | |
| 15 | $S = \sin(\pi/4)\{\cos(3\pi/2)+j \cdot \sin(3\pi/2)\}$ | |
| 16 | $S = \sin(\pi/4)\{\cos(7\pi/4)+j \cdot \sin(7\pi/4)\}$ | |
| 17 | $S = \sin(3\pi/8)\{\cos(\pi/8)+j \cdot \sin(\pi/8)\}$ | ③ |
| 18 | $S = \sin(3\pi/8)\{\cos(3\pi/8)+j \cdot \sin(3\pi/8)\}$ | $S = \sin(3\pi/8)e^{j(2k+1)\pi/8}$ |
| 19 | $S = \sin(3\pi/8)\{\cos(5\pi/8)+j \cdot \sin(5\pi/8)\}$ | |
| 20 | $S = \sin(3\pi/8)\{\cos(7\pi/8)+j \cdot \sin(7\pi/8)\}$ | |
| 21 | $S = \sin(3\pi/8)\{\cos(9\pi/8)+j \cdot \sin(9\pi/8)\}$ | |
| 22 | $S = \sin(3\pi/8)\{\cos(11\pi/8)+j \cdot \sin(11\pi/8)\}$ | |
| 23 | $S = \sin(3\pi/8)\{\cos(13\pi/8)+j \cdot \sin(13\pi/8)\}$ | |
| 24 | $S = \sin(3\pi/8)\{\cos(15\pi/8)+j \cdot \sin(15\pi/8)\}$ | |

HERE, k IS AN INTEGER OF 0 TO 7

(c)
COORDINATE

| No | COORDINATE | | GENERALIZATION |
|---|---|---|---|
| 1 | $S = (1+0 \cdot j)/\sqrt{6}$ | $S = e^{j0}/\sqrt{6}$ | ① |
| 2 | $S = (0+j)/\sqrt{6}$ | $S = e^{j\pi/2}/\sqrt{6}$ | $S = \dfrac{1}{\sqrt{6}} e^{j(k\pi/2)}$ |
| 3 | $S = (-1+0 \cdot j)/\sqrt{6}$ | $S = e^{j\pi}/\sqrt{6}$ | |
| 4 | $S = (0-j)/\sqrt{6}$ | $S = e^{j3\pi/2}/\sqrt{6}$ | |
| 5 | $S = (1+j)/\sqrt{6}$ | $S = \sqrt{2} e^{j\pi/4}/\sqrt{6}$ | ② |
| 6 | $S = (-1+j)/\sqrt{6}$ | $S = \sqrt{2} e^{j3\pi/4}/\sqrt{6}$ | $S = \dfrac{1}{\sqrt{3}} e^{j(2k+1)\pi/4}$ |
| 7 | $S = (-1-j)/\sqrt{6}$ | $S = \sqrt{2} e^{j5\pi/4}/\sqrt{6}$ | |
| 8 | $S = (1-j)/\sqrt{6}$ | $S = \sqrt{2} e^{j7\pi/4}/\sqrt{6}$ | |
| 9 | $S = (2+0 \cdot j)/\sqrt{6}$ | $S = 2 e^{j0}/\sqrt{6}$ | ③ |
| 10 | $S = (0+2 \cdot j)/\sqrt{6}$ | $S = 2 e^{j\pi/2}/\sqrt{6}$ | $S = \sqrt{\dfrac{2}{3}} e^{j(k\pi/2)}$ |
| 11 | $S = (-2+0 \cdot j)/\sqrt{6}$ | $S = 2 e^{j\pi}/\sqrt{6}$ | |
| 12 | $S = (0-2 \cdot j)/\sqrt{6}$ | $S = 2 e^{j3\pi/2}/\sqrt{6}$ | |
| 13 | $S = (2+j)/\sqrt{6}$ | $S = \sqrt{5} e^{j\theta}/\sqrt{6}$ | ④-1 |
| 15 | $S = (-1+2 \cdot j)/\sqrt{6}$ | $S = \sqrt{5} e^{j(\pi/2+\theta)}/\sqrt{6}$ | $S = \sqrt{\dfrac{5}{6}} e^{j(k\pi/2+\theta)}$ |
| 17 | $S = (-2-j)/\sqrt{6}$ | $S = \sqrt{5} e^{j(\pi+\theta)}/\sqrt{6}$ | |
| 19 | $S = (1-2 \cdot j)/\sqrt{6}$ | $S = \sqrt{5} e^{j(3\pi/2+\theta)}/\sqrt{6}$ | |
| 14 | $S = (1+2 \cdot j)/\sqrt{6}$ | $S = \sqrt{5} e^{j(\pi/2-\theta)}/\sqrt{6}$ | ④-2 |
| 16 | $S = (-2+j)/\sqrt{6}$ | $S = \sqrt{5} e^{j(\pi-\theta)}/\sqrt{6}$ | $S = \sqrt{\dfrac{5}{6}} e^{j(k\pi/2-\theta)}$ |
| 18 | $S = (-1-2 \cdot j)/\sqrt{6}$ | $S = \sqrt{5} e^{j(3\pi/2-\theta)}/\sqrt{6}$ | |
| 20 | $S = (2-j)/\sqrt{6}$ | $S = \sqrt{5} e^{j(-\theta)}/\sqrt{6}$ | |

HERE, k IS AN INTEGER OF 0 TO 3

$$\theta = \tan^{-1}\left(\frac{1}{2}\right)$$

(c)
COORDINATE

| No | COORDINATE | GENERALIZATION |
|---|---|---|
| 1 | $S = \sin(\pi/8)\{\cos(\pi/8)+j \cdot \sin(\pi/8)\}$ | ① $S = \sin(\pi/8)e^{j(2k+1)\pi/8}$ |
| 2 | $S = \sin(\pi/8)\{\cos(3\pi/8)+j \cdot \sin(3\pi/8)\}$ | |
| 3 | $S = \sin(\pi/8)\{\cos(5\pi/8)+j \cdot \sin(5\pi/8)\}$ | |
| 4 | $S = \sin(\pi/8)\{\cos(7\pi/8)+j \cdot \sin(7\pi/8)\}$ | |
| 5 | $S = \sin(\pi/8)\{\cos(9\pi/8)+j \cdot \sin(9\pi/8)\}$ | |
| 6 | $S = \sin(\pi/8)\{\cos(11\pi/8)+j \cdot \sin(11\pi/8)\}$ | |
| 7 | $S = \sin(\pi/8)\{\cos(13\pi/8)+j \cdot \sin(13\pi/8)\}$ | |
| 8 | $S = \sin(\pi/8)\{\cos(15\pi/8)+j \cdot \sin(15\pi/8)\}$ | |
| 9 | $S = \sin(\pi/4)\{\cos(0)+j \cdot \sin(0)\}$ | ② $S = \sin(\pi/4)e^{jk\pi/4}$ |
| 10 | $S = \sin(\pi/4)\{\cos(\pi/4)+j \cdot \sin(\pi/4)\}$ | |
| 11 | $S = \sin(\pi/4)\{\cos(\pi/2)+j \cdot \sin(\pi/2)\}$ | |
| 12 | $S = \sin(\pi/4)\{\cos(3\pi/4)+j \cdot \sin(3\pi/4)\}$ | |
| 13 | $S = \sin(\pi/4)\{\cos(\pi)+j \cdot \sin(\pi)\}$ | |
| 14 | $S = \sin(\pi/4)\{\cos(5\pi/4)+j \cdot \sin(5\pi/4)\}$ | |
| 15 | $S = \sin(\pi/4)\{\cos(3\pi/2)+j \cdot \sin(3\pi/2)\}$ | |
| 16 | $S = \sin(\pi/4)\{\cos(7\pi/4)+j \cdot \sin(7\pi/4)\}$ | |
| 17 | $S = \sin(3\pi/8)\{\cos(\pi/8)+j \cdot \sin(\pi/8)\}$ | ③ $S = \sin(3\pi/8)e^{j(2k+1)\pi/8}$ |
| 18 | $S = \sin(3\pi/8)\{\cos(3\pi/8)+j \cdot \sin(3\pi/8)\}$ | |
| 19 | $S = \sin(3\pi/8)\{\cos(5\pi/8)+j \cdot \sin(5\pi/8)\}$ | |
| 20 | $S = \sin(3\pi/8)\{\cos(7\pi/8)+j \cdot \sin(7\pi/8)\}$ | |
| 21 | $S = \sin(3\pi/8)\{\cos(9\pi/8)+j \cdot \sin(9\pi/8)\}$ | |
| 22 | $S = \sin(3\pi/8)\{\cos(11\pi/8)+j \cdot \sin(11\pi/8)\}$ | |
| 23 | $S = \sin(3\pi/8)\{\cos(13\pi/8)+j \cdot \sin(13\pi/8)\}$ | |
| 24 | $S = \sin(3\pi/8)\{\cos(15\pi/8)+j \cdot \sin(15\pi/8)\}$ | |

HERE, k IS AN INTEGER OF 0 TO 7

TRANSMITTER

TECHNICAL FIELD

The present invention relates to a transmitter which efficiently performs communication using a DSTBC (Differential Space-Time Block Coding) scheme.

BACKGROUND ART

For example, a communication technique using an STBC (Space-Time Block Coding) scheme has been studied.

CITATION LIST

Non Patent Literature

[NPL 1] IEICE TRANSACTIONS on Communications, VOL. E92-B, No. 6, June 2009

SUMMARY OF INVENTION

Technical Problem

However, the STBC scheme has some problems in communication, which demand further development.

An object of the invention is to provide a transmitter which is capable of efficiently performing communication using the DSTBC scheme.

Solution to Problem

In order to achieve the above-mentioned object, according to the invention, in a transmitter which transmits a signal using the DSTBC scheme, the following configuration is used.

That is, the content of a transmission process is set so that a state where a symbol is not present is realized at the origin of signal arrangement in a DSTBC encoder.

Thus, it is possible to efficiently perform communication using the DSTBC scheme.

According to the invention, as a configuration example, the following configuration is provided.

That is, as an aspect in which the transmission process content is set so that a state where a symbol is not present is realized at the origin of signal arrangement in the DSTBC encoder, the setting is performed so that an input to the DSTBC encoder is calculated using a predetermined operation in which a state where a symbol is not present is realized at the origin of signal arrangement in the DSTBC encoder.

Accordingly, by appropriately setting the input to the DSTBC encoder as the transmission process content, it is possible to efficiently perform communication using the DSTBC scheme.

According to the invention, as another configuration example, the following configuration is provided.

That is, as another aspect in which the transmission process content is set so that a state where a symbol is not present is realized at the origin of signal arrangement in the DSTBC encoder, the setting is performed so that initial values in which a state where a symbol is not present is realized at the origin of signal arrangement in the DSTBC encoder are used in differential encoding of the DSTBC encoder.

Accordingly, by appropriately setting the initial values of the differential encoding of the DSTBC encoder as the transmission process content, it is possible to efficiently perform communication using the DSTBC scheme.

Specific configuration examples are provided as follows. Formulas in the respective configuration examples will be described in embodiments which will be described later.

In Configuration Example 1, there is provided a transmitter which transmits a signal by a DSTBC scheme, including: a first symbol mapping unit which maps a first bit stream divided from an input bit stream into a value on an IQ plane; a second symbol mapping unit which maps a second bit stream divided from the input bit stream into a value on the IQ plane; and a DSTBC encoder which performs DSTBC encoding for the mapping result in the first symbol mapping unit and the mapping result in the second symbol mapping unit, wherein the DSTBC encoder includes a differential encoding unit which performs differential encoding for the mapping result in the first symbol mapping unit and the mapping result in the second symbol mapping unit, an initial value setting unit which sets initial values of the differential encoding unit, and an STBC encoding unit which performs STBC encoding for the differential encoding result in the differential encoding unit, wherein the first symbol mapping unit performs mapping using one of Formula 4 and Formula 5, wherein the second symbol mapping unit performs mapping using the other one of Formula 4 and Formula 5, wherein the differential encoding unit performs differential encoding using Formula 1, and wherein the initial value setting unit uses, as a combination of two initial values $S_{-2}$ and $S_{-1}$ in Formula 1, any combination in which the phase difference of the two initial values is $n\pi/2$ (n is an integer) among a combination of a value given by Formula 6 and a value given by Formula 8, a combination of a value given by Formula 7 and a value given by Formula 7, and a combination of a value given by Formula 8 and a value given by Formula 6. That is, the initial values are selected from among combinations excluding combinations in which the phase difference of the two initial values is 45°, 135°, 225° and 315°.

In Configuration Example 2, there is provided a transmitter which transmits a signal by a DSTBC scheme, including: a symbol mapping unit which maps a first bit stream and a second bit stream divided from an input bit stream into values on an IQ plane, respectively; and a DSTBC encoder which performs DSTBC encoding for the mapping result in the symbol mapping unit, wherein the DSTBC encoder includes a differential encoding unit which performs differential encoding for the mapping result in the symbol mapping unit, an initial value setting unit which sets the initial values of the differential encoding unit, and an STBC encoding unit which performs STBC encoding for the differential encoding result in the differential encoding unit, wherein the symbol mapping unit performs mapping using Formula 2, wherein the differential encoding unit performs differential encoding using Formula 1, and wherein the initial value setting unit uses, as a combination of two initial values $S_{-2}$ and $S_{-1}$ in Formula 1, any one of a combination of a value given by Formula 10 and a value given by Formula 13 or Formula 14, a combination of a value given by Formula 11 and a value given by Formula 12, a combination of a value given by Formula 12 and a value given by Formula 11, and a combination of a value given by Formula 13 or Formula 14 and a value given by Formula 10.

In Configuration Example 3, there is provided a transmitter which transmits a signal by a DSTBC scheme, the transmitter including: a DSTBC encoder which performs DSTBC encoding, wherein the DSTBC encoder includes a differential encoding unit having a condition given by Formula 18 and Formula 21.

In Configuration Example 4, there is provided a transmission method of transmitting a signal by a DSTBC scheme, including the steps of: mapping a first bit stream divided from an input bit stream into a value on an IQ plane and mapping a second bit stream divided from the input bit stream into a value on the IQ plane; and transmitting a result signal obtained by performing DSTBC encoding for the mapping result of the first bit stream and the mapping result of the second bit stream, wherein the DSTBC encoding is performed using a differential encoding unit which performs differential encoding for the mapping result of the first bit stream and the mapping result of the second bit stream, an initial value setting unit which sets the initial values of the differential encoding unit, and an STBC encoding unit which performs STBC encoding for the differential encoding result in the differential encoding unit, wherein the mapping of the first bit stream is performed using one of Formula 4 and Formula 5, wherein the mapping of the second bit stream is performed using the other of Formula 4 and Formula 5, wherein the differential encoding unit performs differential encoding using Formula 1, and wherein the initial value setting unit uses, as a combination of two initial values $S_{-2}$ and $S_{-1}$ in Formula 1, any combination in which the phase difference of two initial values is $n\pi/2$ (n is an integer) among a combination of a value given by Formula 6 and a value given by Formula 8, a combination of a value given by Formula 7 and a value given by Formula 7, and a combination of a value given by Formula 8 and a value given by Formula 6. That is, the initial values are selected from among combinations excluding combinations in which the phase difference of the two initial values is 45°, 135°, 225° and 315°.

In Configuration Example 5, there is provided a transmission method of transmitting a signal by a DSTBC scheme, including the steps of: mapping a first bit stream and a second bit stream divided from an input bit stream into values on an IQ plane, respectively; and transmitting a result signal obtained by performing DSTBC encoding for the mapping result of the first bit stream and the mapping result of the second bit stream, wherein the DSTBC encoding is performed using a differential encoding unit which performs differential encoding for the mapping result of the first bit stream and the mapping result of the second bit stream, an initial value setting unit which sets the initial values of the differential encoding unit, and an STBC encoding unit which performs STBC encoding for the differential encoding result in the differential encoding unit, wherein the mapping of the first bit stream and the second bit stream is performed using Formula 2, wherein the differential encoding unit performs differential encoding using Formula 1, and wherein the initial value setting unit uses, as a combination of two initial values $S_{-2}$ and $S_{-1}$ in Formula 1, any one of a combination of a value given by Formula 10 and a value given by Formula 13 or Formula 14, a combination of a value given by Formula 11 and a value given by Formula 12, a combination of a value given by Formula 12 and a value given by Formula 11, and a combination of a value given by Formula 13 or Formula 14 and a value given by Formula 10.

In Configuration Example 6, there is provided a transmission method of transmitting a signal by a DSTBC scheme, wherein the transmitter includes a DSTBC encoder which performs DSTBC encoding, wherein the DSTBC encoder performs differential encoding under the conditions given by Formula 18 and Formula 21.

Advantageous Effects Of Invention

As described above, with the transmitter according to the invention, it is possible to efficiently perform communication using the DSTBC scheme.

DESCRIPTION OF EMBODIMENTS

Embodiments of the invention will be described with reference to the accompanying drawings.

A fundamental technique of the invention will be described.

For example, in communication with a mobile station, as a method of enhancing the reception quality of a mobile station apparatus, there is a transmission diversity scheme based on an STBC scheme.

In the STBC scheme, since transmission diversity can be realized without using CSI (channel state information) in a transmitter, the STBC scheme is effective under the phasing environment, but there is a defect that CSI is necessary on a receiver side. CSI is an element given to a signal when the signal propagates in space or the like, and is estimated on the reception side using a training signal or the like when fluctuation is smooth. However, in a case where the CSI is applied to a communication system which has a narrow transmission frequency band and moves at high speed, since parameters fluctuate during training, it is difficult to efficiently perform communication, which causes a significant problem.

Thus, a DSTBC scheme in which the CSI is not necessary in a transmitter and a receiver has been proposed by Tarokh et al. In the DSTBC scheme, since the CSI is not necessary even on the receiver side, the DSTBC scheme is effective in a high-speed phasing environment which could not be tracked using STBC. Here, a modulation method of the DSTBC scheme is a method of transmission diversity in radio communication.

A fundamental configuration of the DSTBC scheme used in the invention will be described.

Hereinafter, with respect to an operation of a transmitter of a base station apparatus which employs the DSTBC scheme, a case where 4-valued digital modulation (2 bits/1 symbol) is used will be schematically described as an example. In a radio communication system, for example, the base station apparatus performs communication (transmission or reception) with a mobile station in a wireless manner. For example, this is an example of the 4-valued digital modulation (2 bits/1 symbol).

In the transmitter of this example, the following processes are performed in the unit of four bits with respect to an input signal of a bit stream obtained by digitalizing a signal (for example, a sound signal) which is a transmission target.

Firstly, an input signal of 4 bits ($b_{4n}$, $b_{4n+1}$, $b_{4n+2}$, $b_{4n+3}$) is divided into ($b_{4n}$, $b_{4n+1}$) of 2 bits and ($b_{4n+2}$, $b_{4n+3}$) of 2 bits, and mapping is performed for each set of two symbols according to symbol modulation which is designated in advance.

Here, the symbol modulation result for 2 bits of the first half ($b_{4n}$, $b_{4n+1}$) is represented by $X_{2t}$ and the symbol modulation result for 2 bits of the second half ($b_{4n+2}$, $b_{4n+3}$) is represented by $X_{2t+1}$. The symbol modulation results $X_{2t}$ and $X_{2t+1}$ are complex numbers.

Further, n (=0, 1, 2, . . . ) is a time series number which varies every 4 bits.

Further, t is t=n, and is a time series number which varies every two symbols.

Next, differential encoding is performed by the operation of Formula 1 on the basis of $X_2$ and $X_{2t+1}$ which are the symbol modulation results to obtain $S_{2t}$ and $S_{2t+1}$. In Formula 1, $S_{2t}$ and $S_{2t+1}$ calculated using the inputs $X_{2t}$ and $X_{2t+1}$ and the previous outputs $S_{2t-2}$ and $S_{2t-1}$ are output.

Here, in Formula 1, * represents conjugate complex numbers. Further, it is assumed that the input X satisfies $|X_{2t}|^2+|X_{2t+1}|^2=1$ and $|X_{2t}|^2=|X_{2t+1}|^2=0.5$, and the output S satisfies $|S_{2t}|^2+|S_{2t+1}|^2=1$.

[Expression 1]

$$\begin{bmatrix} S_{2t} \\ S_{2t+1} \end{bmatrix} = \begin{bmatrix} S_{2t-2} & -S_{2t-1}^* \\ S_{2t-1} & S_{2t-2}^* \end{bmatrix} \begin{bmatrix} X_{2t} \\ X_{2t+1} \end{bmatrix} \quad \text{(Formula 1)}$$

Next, space-time block coding is performed for $S_{2t}$ and $S_{2t+1}$ which are the differential encoding results. In the space-time block coding of this example, a stream output in such an order that $S_{2t}$ is output at a timing of a symbol number 2t and then $-S_{2t+1}^*$ is output at a timing of a symbol number 2t+1 is output to a first transmission system, and a stream output in such an order that $S_{2t+3}$ is output at the timing of the symbol number 2t and then $S_{2t}^*$ is output at the timing of the symbol number 2t+1 is output to a second transmission system.

Each of the first transmission system and the second transmission system includes a transmission unit, a power amplifier, and an antenna unit, and performs the following processes.

The transmission unit performs a filtering process, a D/A (Digital to Analog) conversion process or an orthogonal modulation process for a signal of the space-time block coding result, and then outputs the signal which is modulated into a desired radio transmission frequency to the power amplifier.

The power amplifier amplifies the input (transmission signal) from the transmission unit up to a radio output level, and then outputs the result to the antenna unit.

The antenna unit outputs the input (transmission signal) from the power amplifier in a wireless manner.

Here, a case in which X which is the symbol modulation result is given by Formula 2 and initial values $S_{-2}$ and $S_{-1}$ which are necessary for operation at a timing of t=0 are given by Formula 3, with respect to the operation of Formula 1, will be described.

Here, in this example, with respect to patterns of input bits in Formula 2, "00" is allocated to a first pattern, "01" is allocated to a second pattern, "11" is allocated to a third pattern, and "11" is allocated to a fourth pattern. This is merely an example, and other allocation methods may be used.

[Expression 2]

$X=\frac{1}{2}(1+j)$ when input bits correspond to the first pattern, $X=\frac{1}{2}(-1+j)$ when input bits correspond to the second pattern, $X=\frac{1}{2}(-1j)$ when input bits correspond to the third pattern, and $X=\frac{1}{2}(1-j)$ when input bits correspond to the fourth pattern  (Formula 2)

[Expression 3]

$$\begin{bmatrix} S_{-2} \\ S_{-1} \end{bmatrix} = \frac{1}{\sqrt{2}} \begin{bmatrix} 1 \\ 1 \end{bmatrix} \quad \text{(Formula 3)}$$

Figure 7:
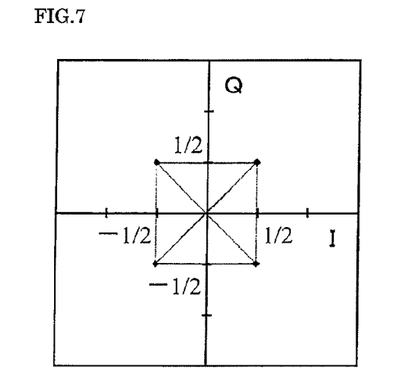
FIG. 7 is a diagram illustrating an example of the signal arrangement of a symbol mapping unit.

If the input bits are randomly changed and X ($X_{2t}$ or $X_{2t+1}$) is given by Formula 2 in symbol modulation, the signal arrangement of the symbol modulation results becomes as shown in FIG. 7.

FIG. 7 shows an example of the signal arrangement of the symbol modulation results (for example, symbol map of QPSK modulation). The horizontal axis represents an in-phase (I) component, and the vertical axis represents an orthogonal (Q) component. j represents an imaginary number unit.

Figure 8:
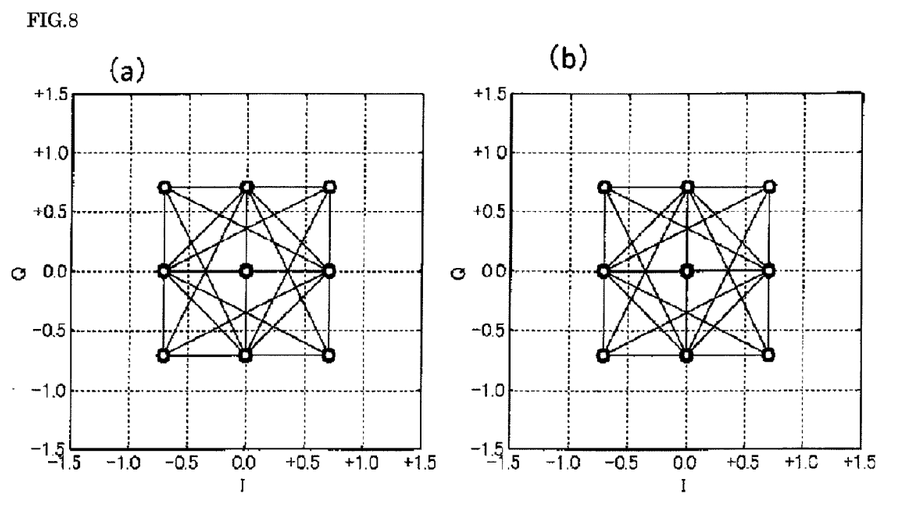
FIG. 8(a) is a diagram illustrating an example of the signal arrangement of a differential encoding unit with respect to 2 bits of the first half.
FIG. 8(b) is a diagram illustrating an example of the signal arrangement of a differential encoding unit with respect to 2 bits of the second half.

Further, if Formula 1 is sequentially calculated using the initial values in Formula 3, the signal arrangement of the differential encoding results becomes a signal arrangement which includes the origin (zero point) as shown FIGS. 8(a) and 8(b).

FIG. 8(a) shows an example of the signal arrangement of the differential encoding result $S_{2t}$, and FIG. 8(b) shows an example of the signal arrangement of the differential encoding result $S_{2t+1}$, in which coordinates S of 9 points are shown, respectively. The horizontal axis represents an orthogonal (Q) component, and the vertical axis represents an in-phase (I) component.

In the space-time block coding, S* or −S* is calculated with respect to S ($S_{2t}$ or $S_{2t+1}$) in Formula 1 to be output in a predetermined order, and the arrangement of the output signals has the same points as shown in FIGS. 8(a) and 8(b) with the transition order being changed. That is, the space-time block coding results become a signal arrangement which includes the origin.

However, the distance from the origin represents the amplitude of a modulated wave envelope of the transmission unit, and in a case where the space-time block coding results include the origin, fluctuation of the envelope amplitude is increased, which causes a problem that the performance necessary for the power amplifier becomes strict so as to suppress generation of non-linear distortion.

Thus, an object of the invention is to provide a signal arrangement which does not include the origin (zero point) in order to reduce fluctuation of the envelope amplitude of a transmitted waveform, in a transmitter using the DSTBC scheme.

Here, if a symbol modulation output $X_i$ is expressed as Formula 16 and a differential encoding result is expressed as Formula 17 in amplitude and phase, Formula 1 may be expressed as Formula 18.

[Expression 4]

$$X_i = \frac{1}{\sqrt{2}} e^{j\theta_i} \quad \text{(Formula 16)}$$

($\theta_i$ is a real number)

[Expression 5]

$$S_i = \alpha_i e^{j\phi_i} \quad \text{(Formula 17)}$$

($\alpha_i$ is a non-negative real number and $\phi_i$ is a real number)

[Expression 6]

$$\begin{bmatrix} S_{2t} \\ S_{2t+1} \end{bmatrix} = \frac{1}{\sqrt{2}} \begin{bmatrix} \alpha_{2t-2} e^{j(\theta_{2t}+\phi_{2t-2})} - \alpha_{2t-1} e^{j(\theta_{2t-1}-\phi_{2t-1})} \\ \alpha_{2t-1} e^{j(\theta_{2t}+\phi_{2t-1})} + \alpha_{2t-2} e^{j(\theta_{2t-1}-\phi_{2t-2})} \end{bmatrix} \quad \text{(Formula 18)}$$

Accordingly, in order to realize the signal arrangement which does not the origin, Formula 19 and Formula 20 should not be zero constantly with respect to a random bit input stream. To this end, a condition corresponds to Formula 21. Here, by setting the symbol modulation outputs and the differential encoding initial values $S_{-2}$ and $S_{-1}$ so that Formula 21 is constantly satisfied with respect to the random bit input stream, it is possible to realize the signal arrangement which does not include the origin.

[Expression 7]

$$\alpha_{2t-2} e^{j(\theta_{2t}+\phi_{2t-2})} - \alpha_{2t-1} e^{j(\theta_{2t-1}-\phi_{2t-1})} \quad \text{(Formula 19)}$$

[Expression 8]

$$\alpha_{2t-1} e^{j(\theta_{2t}+\phi_{2t-1})} + \alpha_{2t-2} e^{j(\theta_{2t-1}-\phi_{2t-2})} \quad \text{(Formula 20)}$$

[Expression 9]

$\alpha_{2t-2}-\alpha_{2t-1}\neq 0$ or $(\theta_{2t}+\phi_{2t-2})-(\theta_{2t-1}-\phi_{2t-1})\neq n\pi$ ($n$ is an integer)  (Formula 21)

First Embodiment

A first embodiment of the invention will be described.

Figure 1:
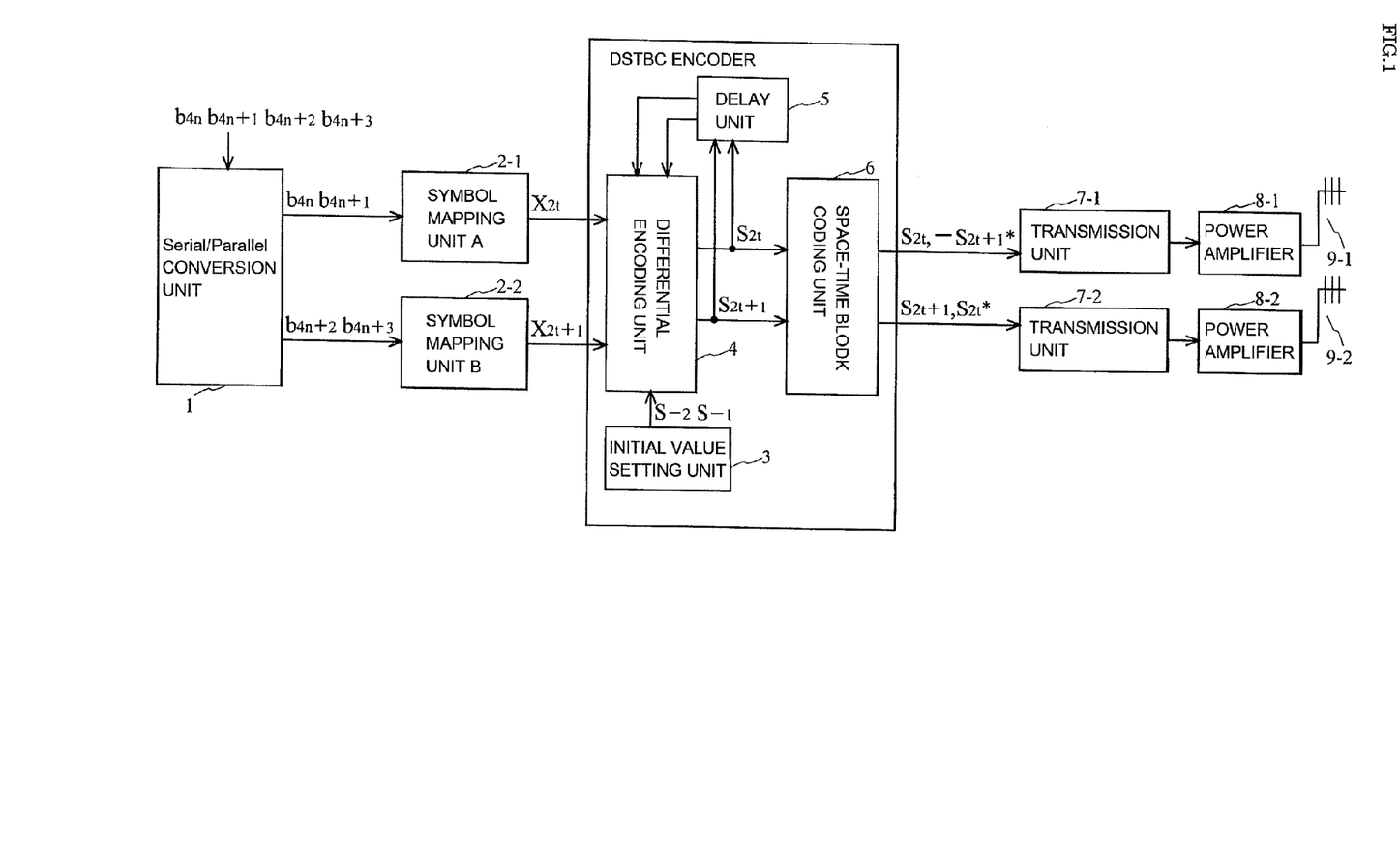
FIG. 1 is a diagram illustrating a configuration example of a transmitter of a base station apparatus according to a first embodiment and a second embodiment of the invention.

FIG. 1 is a diagram illustrating a configuration example of a transmitter of a base station apparatus using the DSTBC scheme according to an embodiment of the invention.

The transmitter in this example includes a serial/parallel conversion unit 1, two symbol mapping units (symbol mapping unit A and symbol mapping unit B) 2-1 and 2-2, an initial value setting unit 3, a differential encoding unit 4, a delay unit 5, a space-time block coding (STBC) unit 6, two transmission units 7-1 and 7-2, two power amplifiers (for example, power amplifier) 8-1 and 8-2, and two antenna units (for example, transmission antenna) 9-1 and 9-2.

In this example, a DSTBC encoder is configured by the initial value setting unit 3, the differential encoding unit 4, the delay unit 5, and the space-time block coding unit 6.

An operation example in the transmitter in this example will be described.

The serial/parallel conversion unit 1 receives a signal of a bit stream obtained by digitalizing, for example, a sound signal or the like, divides the signal in the unit of two symbols, and outputs the result to the symbol mapping units 2-1 and 2-2 at symbol timings.

In 4-valued digital modulation (2 bits/1 symbol) in this example, an input signal of 4 bits ($b_{4n}$, $b_{4n+1}$, $b_{4n+2}$, $b_{4n+3}$) is divided into ($b_{4n}$, $b_{4n+1}$) of 2 bits and ($b_{4n+2}$, $b_{4n+3}$) of 2 bits. Then, ($b_{4n}$, $b_{4n+1}$) is output to the first symbol mapping unit (symbol mapping unit A) 2-1 at a first symbol timing, and ($b_{4n+2}$, $b_{4n+3}$) is output to the second symbol mapping unit (symbol mapping unit B) 2-2 at the next symbol timing.

Here, n (=0, 1, 2, ...) is a time series number which varies every 4 bits.

As the symbol modulation of the 4-valued digital modulation (2 bits/1 symbol), a modulation scheme called QPSK (Quadrature Phase Shift Keying) is used as an example.

Further, as another configuration example, a configuration in which the input signal of 4 bits ($b_{4n}$, $b_{4n+1}$, $b_{4n+2}$, $b_{4n+3}$) is divided into ($b_{4n}$, $b_{4n+1}$) of 2 bits and ($b_{4n+2}$ and $b_{4n+3}$) of 2 bits and $B_{2m}$=($b_{4n}$/$b_{4n+1}$) of 2 bits of the first half and $B_{2m+1}$=($b_{4n+2}$, $b_{4n+3}$) of 2 bits of the second half are simultaneously output when the symbol number is 2m+1 may be used. Here, m is a time series number which varies every two symbols.

If ($b_{4n}$, $b_{4n+1}$) or ($b_{4n+2}$, $b_{4n+3}$) is input from the serial/parallel conversion unit 1, each of the symbol mapping units 2-1 and 2-2 performs mapping according to a symbol modulation, which is designated in advance, and outputs the result to the differential encoding unit 4.

Specifically, with respect to two symbols divided in the serial/parallel conversion unit 1, the symbol modulation result $X_{2t}$ for the input of ($b_{4n}$, $b_{4n+1}$) is output by the symbol mapping unit 2-1, and the symbol modulation result $X_{2t+1}$ for the input of ($b_{4n+2}$, $b_{4n+3}$) is output by the symbol mapping unit 2-2.

Here, t is t=n, and is a time series number which varies every two symbols. Further, the symbol modulation results $X_{2t}$ and $X_{2t+1}$ are complex numbers.

After receiving the symbol modulation results $X_{2t}$ and $X_{2t+1}$, the differential encoding unit 4 outputs $S_{2t}$ and $S_{2t+1}$ obtained by operation of Formula 1 to the delay unit 5 and the space-time block coding unit 6. In Formula 1, $S_{2t}$ and $S_{2t+1}$ calculated using the inputs $X_{2t}$ and $X_{2t+1}$ and previous outputs $S_{2t}$ and $S_{2t+1}$ are output.

Here, in Formula 1, * represents conjugate complex numbers.

The initial value setting unit 3 outputs and provides the initial values $S_{-2}$ and $S_{-1}$ necessary for the operation of Formula 1 at t=0 to the differential encoding unit 4.

The delay unit 5 delays $S_{2t}$ and $S_{2t+1}$ input from the differential encoding unit 4 and outputs the result to the differential encoding unit 4 so that the operation of Formula 1 can be performed in the differential encoding unit 4.

The space-time block coding unit 6 outputs the results obtained by performing the space-time block coding for the inputs to the transmission units 7-1 and 7-2. In this example, in the space-time block coding unit 6, a stream output in such an order that $S_{2t}$ is output at a timing of a symbol number 2t and then $-S_{2t+1}{}^*$ is output at a timing of a symbol number 2t+1 is output to the first transmission unit 7-1, and a stream output in such an order that $S_{2t+1}$ is output at the timing of the symbol number 2t and then $S_{2t}{}^*$ is output at the timing of the symbol number 2t+1 is output to the second transmission unit 7-2.

In the first transmission system which includes the first transmission unit 7-1, the first power amplifier 8-1, and the first antenna unit 9-1 and the second transmission system which includes the second transmission unit 7-2, the second power amplifier 8-2, and the second antenna unit 9-2, the same processes are respectively performed.

Each of the transmission units 7-1 and 7-2 performs a filtering process, a D/A (Digital to Analog) conversion process or an orthogonal modulation process for an input from the space-time block coding unit 6, and then outputs the signal which is modulated into a desired radio transmission frequency to each of the power amplifiers 8-1 and 8-2.

Each of the power amplifiers 8-1 and 8-2 amplifies the input (transmission signal) from each of the transmission units 7-1 and 7-2 up to a radio output level, and then outputs the result to each of the antenna units 9-1 and 9-2.

Each of the antenna units 9-1 and 9-2 outputs the input (transmission signal) from each of the power amplifiers 8-1 and 8-2 in a wireless manner.

Here, in each of the symbol mapping units 2-1 and 2-2 in this example, different symbol modulations are respectively defined with respect to the first output ($b_{4n}$, $b_{4n+1}$) and the second output ($b_{4n+2}$, $b_{4n+3}$) from the serial/parallel conversion unit 1.

That is, the first symbol mapping unit (symbol mapping unit A) 2-1 receives the first output ($b_{4n}$, $b_{4n+1}$) from the serial/parallel conversion unit 1, and calculates $X_{2t}$ given by Formula 4 similar to Formula 2 to output the result to the differential encoding unit 4.

On the other hand, the second symbol mapping unit (symbol mapping unit B) 2-2 receives the second output ($b_{4n+2}$, $b_{4n+3}$) from the serial/parallel conversion unit 1, and calculates $X_{2t+1}$ given by Formula 5 to output the result to the differential encoding unit 4. Here, Formula 5 is obtained by rotating Formula 4 by −45° on the IQ plane.

[Expression 10]

$X_{2t}=\frac{1}{2}(1+j)$ when input bits correspond to the first pattern, $X_{2t}=\frac{1}{2}(-1+j)$ when input bits correspond to the second pattern, $X_{2t}=\frac{1}{2}(-1-j)$ when input bits correspond to the third pattern, and $X_{2t}=\frac{1}{2}(1-j)$ when input bits correspond to the fourth pattern (Formula 4)

[Expression 11]

$X_{2t+1}=1/\sqrt{2}$ when input bits correspond to the first pattern, $X_{2t+1}=j1/\sqrt{2}$ when input bits correspond to the second pattern, $X_{2t+1}=-j1/\sqrt{2}$ when input bits correspond to the third pattern, and $X_{2t+1}=-j1/\sqrt{2}$ when input bits correspond to the fourth pattern (Formula 5)

In this example, with respect to the patterns of the input bits in Formula 4 and 5, "00" is allocated to the first pattern, "01" is allocated to the second pattern, "11" is allocated to the third pattern, and "10" is allocated to the fourth pattern. This is merely an example, and other allocation methods may be used. Further, Formula 4 and Formula 5 may use a different pattern allocation method.

Figure 2:
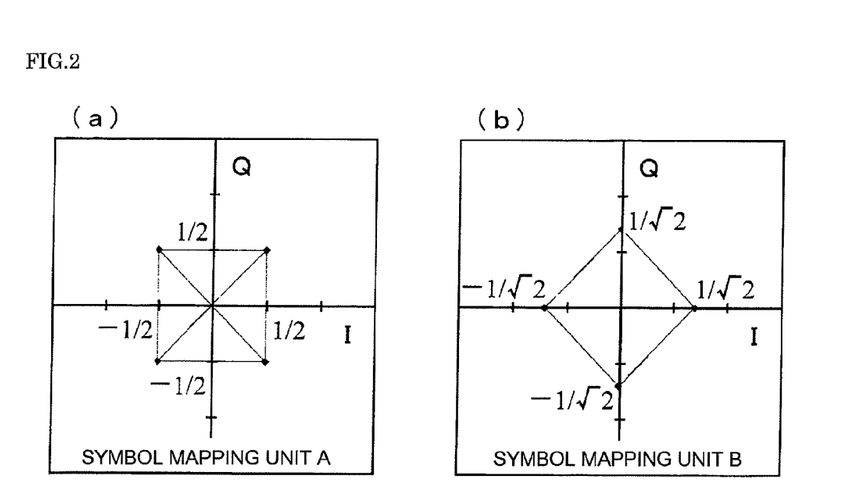
FIG. 2(a) is a diagram illustrating an example of the signal arrangement of a first symbol mapping unit (symbol mapping unit A)
FIG. 2(b) is a diagram illustrating an example of the signal arrangement of a second symbol mapping unit (symbol mapping unit B).

If $X_{2t}$ is given by Formula 4 and $X_{2t+1}$ is given by Formula 5 by randomly changing the input bits of the serial/parallel conversion unit 1, output signal arrangement of the first symbol mapping unit (symbol mapping unit A) 2-1 and output signal arrangement of the second symbol mapping unit (symbol mapping unit B) 2-2 become as shown in FIGS. 2(a) and 2(b).

FIG. 2(a) is a diagram illustrating an example of signal arrangement of the first symbol mapping unit (symbol mapping unit A) 2-1, and FIG. 2(b) is a diagram illustrating an example of signal arrangement of the second symbol mapping unit (symbol mapping unit B) 2-2. The horizontal axis represents an in-phase (I) component, and the vertical axis represents an orthogonal (Q) component.

Further, if Formula 1 is calculated using the initial values shown in Formula 3, the output signal arrangement of the differential encoding unit 4 becomes as shown in FIGS. 3(a) and (b), which is a signal arrangement which does not include the origin.

FIG. 3(a) shows an example of signal arrangement of the differential encoding result $S_{2t}$, FIG. 3(b) shows an example of signal arrangement of the differential encoding result $S_{2t+1}$, which respectively show the coordinates S of 24 points. The horizontal axis represents an in-phase (I) component, and the vertical axis represents an orthogonal (Q) component.

Further, the outputs of the space-time block coding unit 6 at the second stage have the same signal arrangement, which may be a signal arrangement which does not include the origin.

The initial values shown in Formula 3 are an example, and the same effect can also be obtained using different initial values specified as described later.

That is, 24 points shown in FIGS. (a) and 3(b) are divided into a first group which includes eight points which satisfy $r=\sin(\pi/8) \cong 0.38$, a second group which includes eight points which satisfy $r=\sin(\pi/4) \cong 1/\sqrt{2}$, and a third group which includes eight points which satisfy $r=\sin(3\pi/8) \cong 0.92$, where the distance from the origin is r. Further, as the initial values $S_{-2}$ and $S_{-1}$, any combination in which a phase difference of two initial values is $n\pi/2$ (n is an integer) is used from among a combination of an arbitrary one point in the first group and an arbitrary one point in the third group, a combination of an arbitrary one point in the second group and an arbitrary one point in the second group, and a combination of an arbitrary one point in the third group and an arbitrary one point in the first group. That is, the initial values are selected from combinations excluding combinations in which the phase difference of two initial values is 45°, 135°, 225° and 315°. In a case where the initial values $S_{-2}$ and $S_{-1}$ of such a combination are used, it is also possible to make the output signals of the differential encoding unit 4 (and output signal of the space-time block coding unit 6 at the second stage) have a signal arrangement which does not include the origin. Here, Formula 3 corresponds to the combination of initial values in a case where k=0 in the second group (Formula 7 to be described later) and different initial values in a case where k=0 in the same second group.

Here, the coordinates of 24 points shown in FIGS. 3(a) and 3(b) may be expressed as coordinate equations as shown in FIG. 3(c).

FIG. 3(c) illustrates individually coordinate equations indicating the respective coordinates of 24 points, and illustrates coordinate equations which are re-expressed for each group. That is, eight coordinate equations (Nos. 1 to 8) relating to the first group may be converted into Formula 6, eight coordinate equations (Nos. 9 to 16) relating to the second group may be converted into Formula 7, and eight coordinate equations (Nos. 17 to 24) relating to the third group may be converted into Formula 8. In Formula 6 to Formula 8, k is an integer of 0 to 7.

That is, when the operation using Formula 1 is performed for $X_{2t}$ and $X_{2t+1}$ given by Formula 4 and Formula 5, by using any one of a combination of a value (coordinates of an arbitrary one point) given by Formula 6 and a value given by Formula 8, a combination of a value given by Formula 7 and a value given by Formula 7, and a combination of a value given by Formula 8 and a value given by Formula 6 as the combination of the initial values $S_{-2}$ and $S_{-1}$, it is possible to achieve signal arrangement shapes shown in FIGS. 3(a) and 3(b). Here, the initial values used by the combinations of Formula 6 to Formula 8 correspond to a combination in which the phase difference of two initial values is $n\pi/2$ (n is an integer). That is, the initial values are selected from among combinations excluding combinations where the phase difference of two initial values is 45°, 135°, 225° and 315°.

[Expression 12]

$$S=\sin(\pi/8)e^{j(2k+1)\pi/8} \quad \text{(Formula 6)}$$

[Expression 13]

$$S=\sin(\pi/4)e^{jk\pi/4} \quad \text{(Formula 7)}$$

[Expression 14]

$$S=\sin(3\pi/8)e^{j(2k+1)\pi/8} \quad \text{(Formula 8)}$$

Here, the reason why the phase difference of the initial values is set to $n\pi/2$ will be described.

Among the combinations of Formula 6 to Formula 8, the combinations where the phase difference is $n\pi/2$ represent combinations of subsequent outputs (symbol arrangement) of the differential encoding unit 4 in addition to the initial values.

On the other hand, among the combinations of Formula 6 to Formula 8, the combinations where the phase difference is 45°, 135°, 225° and 315° are not output from the differential encoding unit 4 even though the phase difference of the initial values is set to $n\pi/2$. Further, in a case where the initial values where the phase difference is 45°, 135°, 225° and 315° are set, subsequent outputs of the differential encoding unit 4 have a symbol arrangement which is not shown in the combinations of Formula 6 to Formula 8 (that is, do not have the symbol arrangement shown in FIG. 3).

Figure 3:
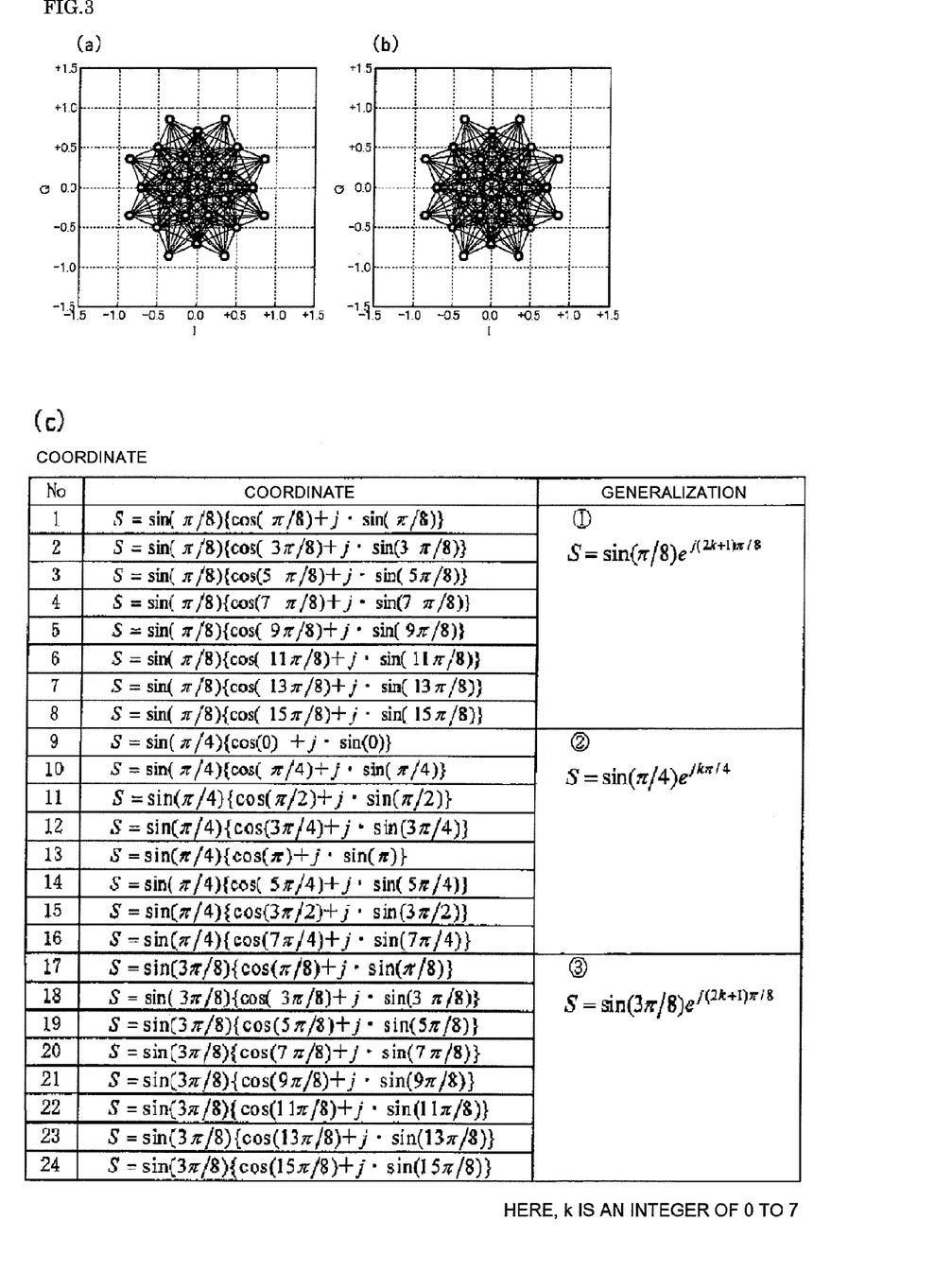
FIG. 3(a) is a diagram illustrating an example of the signal arrangement of a differential encoding unit with respect to 2 bits of the first half.
FIG. 3(b) is a diagram illustrating an example of the signal arrangement of a differential encoding unit with respect to 2 bits of the second half.
FIG. 3(c) is a diagram illustrating an example of a coordinate equation indicating the coordinates of each signal.

Accordingly, by setting the combination so that the phase difference of two initial values is $n\pi/2$, the symbol arrangement may not include the origin, and the outputs of the differential encoding unit 4 may not be limited to the symbol arrangement of 24 points shown in FIG. 3.

As described above, in this example, in the radio transmitter of the DSTBC scheme which includes the input unit, the serial/parallel conversion unit 1, the symbol mapping units 2-1 and 2-2, the initial value setting unit 3, the differential encoding unit 4, the delay unit 5, the space-time block coding unit 6, the transmission units 7-1 and 7-2, the power amplifiers 8-1 and 8-2, and the antenna units 9-1 and 9-2, the symbol mapping units 2-1 and 2-2 which performs symbol modulation are provided so that the output signal arrangement of the space-time block coding unit 6 does not include the origin (zero point). Further, the initial value setting unit 103 which gives the initial values to the differential encoding unit 104 is provided so that the output signal arrangement of the space-time block coding unit 106 does not include the origin (zero point).

In this way, in the transmitter using the DSTBC scheme of this example, an input to the DSTBC encoder is calculated using a predetermined operation and initial values of the DSTBC encoder (differential encoding unit 104 thereof) are set so that a state where a symbol is not present is realized at the origin of signal arrangement in the DSTBC encoder, and thus, the origin is not included in the signal arrangement. Thus, it is possible to reduce fluctuation in the envelope amplitude of the transmitted waveform. Accordingly, it is possible to alleviate the performance which is necessary for the power amplifiers 8-1 and 8-2.

Here, in this example, Formula 4 and Formula 5 are used in the symbol mapping units 2-1 and 2-2, and Formula 6 to Formula 8 are used in the initial value setting unit 3, but various operation formulas and initial values in which a state where a symbol is not present is realized at the origin of signal arrangement may be used.

Second Embodiment

A second embodiment of the invention will be described.

A configuration of a transmitter in this example is substantially the same as the configuration shown in FIG. 1 described in the first embodiment, and thus, its description will be made with reference to FIG. 1 for ease of description.

Here, the configuration or operation of the transmitter in this example is the same as the configuration or operation of the transmitter according to the first embodiment except that Formulas used in symbol mapping units 2-1 and 2-2 are different, for example. That is, in the transmitter in this example, configurations or operations of a serial/parallel conversion unit 1, an initial value setting unit 3, a differential encoding unit 4, a delay unit 5, a space-time block coding unit 6, transmission units 7-1 and 7-2, power amplifiers 8-1 and 8-2, and antenna units 9-1 and 9-2 are the same as the configurations or operations of the corresponding functional units in the transmitter according to the first embodiment.

An example of the operation of the transmitter in this example will be described.

In this example, the symbol mapping units 2-1 and 2-2 which are different from those of the transmitter according to the first embodiment will be described in detail, and description about the same units will be simplified or omitted.

In the first embodiment, Formula 4 is used in the first symbol mapping unit (symbol mapping unit A) 2-1 and Formula 5 is used in the second symbol mapping unit (symbol mapping unit B) 2-2, but in this example, Formula 5 is used in the first symbol mapping unit (symbol mapping unit A) 2-1 and Formula 4 is used in the second symbol mapping unit (symbol mapping unit B) 2-2.

That is, if $X_{2t}$ is given by Formula 5 and $X_{2t+1}$ is given by Formula 4 by randomly changing the input bits of the serial/parallel conversion unit 1, output signal arrangement of the first symbol mapping unit (symbol mapping unit A) 2-1 is as shown in FIG. 2(b), and output signal arrangement of the second symbol mapping unit (symbol mapping unit B) 2-2 is as shown in FIGS. 2(a), differently from the first embodiment.

Figure 9:
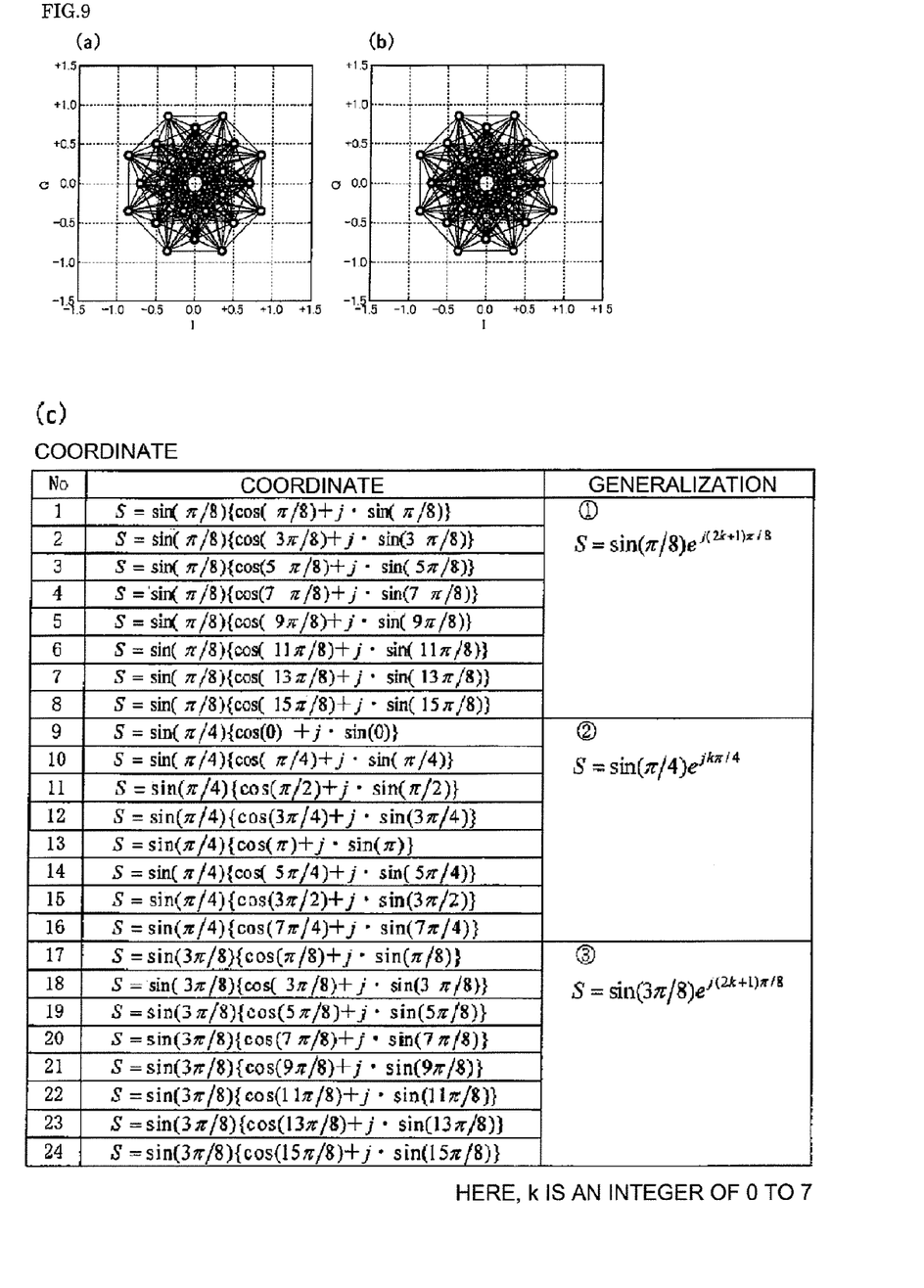
FIG. 9(a) is a diagram illustrating an example of the signal arrangement of a differential encoding unit with respect to 2 bits of the first half.
FIG. 9(b) is a diagram illustrating an example of the signal arrangement of a differential encoding unit with respect to 2 bits of the second half.
FIG. 9(c) is a diagram illustrating an example of a coordinate equation indicating the coordinates of each signal.

Further, if Formula 1 is calculated using the initial values given by Formula 6 to Formula 8 (for example, initial values given by Formula 3), output signal arrangement of the differential encoding unit 4 is as shown in FIGS. 9(a) and 9(b), which is a signal arrangement which does not include the origin.

Further, the outputs of the second stage space-time block coding unit 6 have the same signal arrangement, which may be a signal arrangement which does not include the origin.

Third Embodiment

A third embodiment of the invention will be described.

Figure 4:
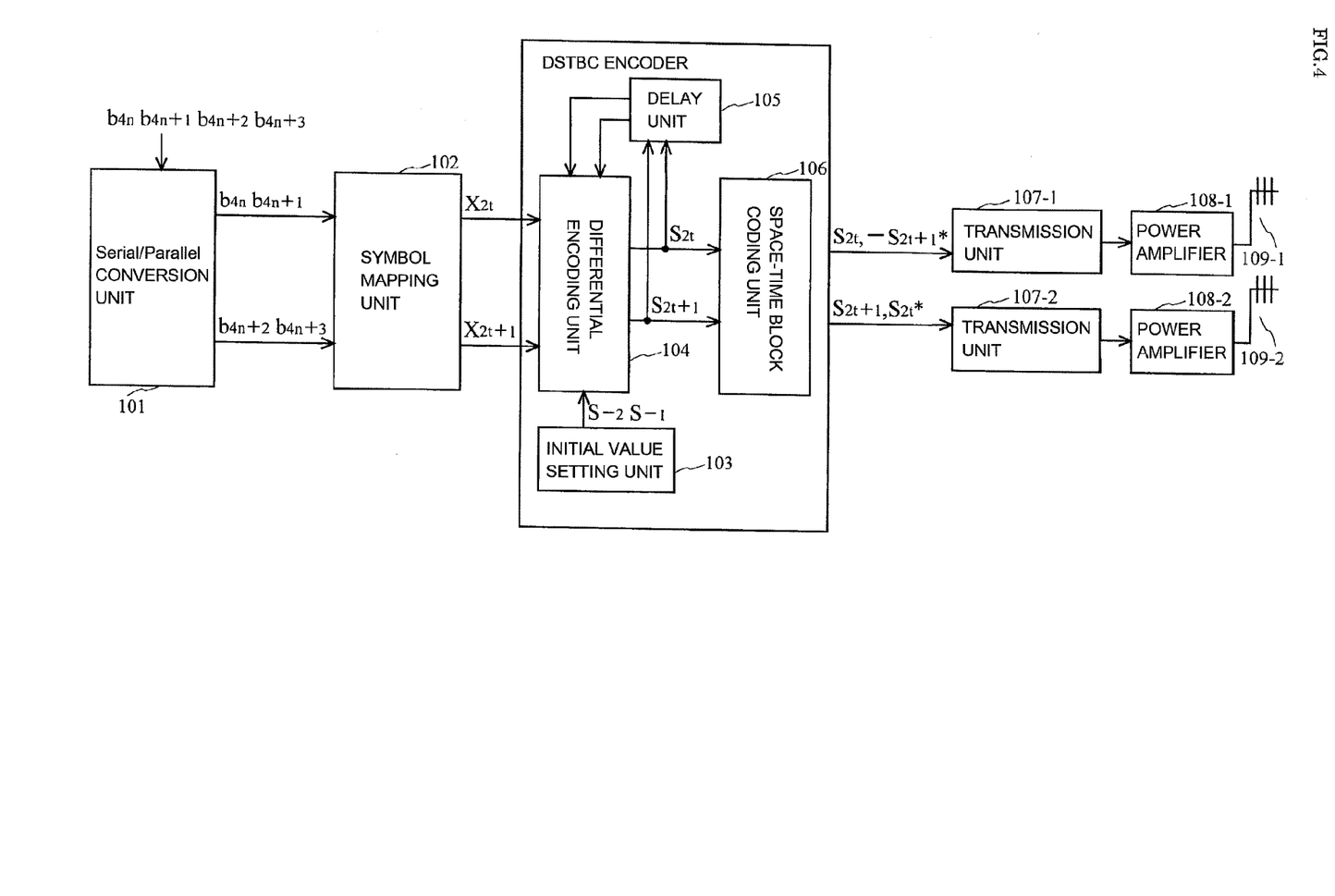
FIG. 4 is a diagram illustrating a configuration example of a transmitter of a base station apparatus according to a third embodiment and a fourth embodiment of the invention.

FIG. 4 shows a configuration example of a transmitter of a base station apparatus using the DSTBC scheme according to an embodiment of the invention.

The transmitter in this embodiment includes a serial/parallel conversion unit 101, a symbol mapping unit 102, an initial value setting unit 103, a differential encoding unit 104, a delay unit 105, an STBC (space-time block coding) unit 6, two transmission units 107-1 and 107-2, two power amplifiers (for example, power amplifier) 108-1 and 108-2, and two antenna units (for example, transmission antenna) 109-1 and 109-2.

In this example, a DSTBC encoder is configured by the initial value setting unit 103, the differential encoding unit 104, the delay unit 105, and the space-time block coding unit 106.

Here, the configuration or operation of the transmitter in this example is the same as the configuration or operation of the transmitter according to the first embodiment, except that one symbol mapping unit 102 is provided and initial values set by the initial value setting unit 103 are different. That is, in the transmitter in this example, configurations or operations of the serial/parallel conversion unit 101, the differential encoding unit 104, the delay unit 105, the space-time block coding unit 106, the transmission units 107-1 and 107-2, the power amplifiers 108-1 and 108-2, and the antenna units 109-1 and 109-2 are the same as the configurations or operations of the corresponding functional units in the transmitter according to the first embodiment.

An example of the operation of the transmitter in this example will be described.

The symbol mapping unit 102 and the initial value setting unit 103 which are different from those of the transmitter according to the first embodiment will be described in detail in this example, and description about the same units will be simplified or omitted.

A main function of the symbol mapping unit 102 in this example is the same as that of each of the symbol mapping units 2-1 and 2-2 shown in FIG. 1, but in this example, common symbol modulation shown in Formula 2 is defined with respect to the first output ($b_{4n}$, $b_{4n+1}$) and the second output ($b_{4n+2}$, $b_{4n+3}$) from the serial/parallel conversion unit 1. That is, the same symbol modulation as the above-described fundamental DSTBC scheme is performed.

Further, considering that signal arrangement or the number of signal points is changed by a setting method of initial values, initial values $S_{-2}$ and $S_{-1}$ output from the initial value setting unit 103 are given by Formula 9 instead of Formula 3.

[Expression 15]

$$\begin{bmatrix} S_{-2} \\ S_{-1} \end{bmatrix} = \frac{1}{\sqrt{6}} \begin{bmatrix} 1 \\ 2+j \end{bmatrix}$$ (Formula 9)

When the initial values are given by Formula 9, output signal arrangement of the differential encoding unit 104 is as shown in FIGS. 5(a) and 5(b), which is a signal arrangement which does not include the origin.

FIG. 5(a) shows an example of the signal arrangement of a differential encoding result $S_{2t}$, FIG. 5(b) shows an example of the signal arrangement of a differential encoding result $S_{2t+1}$ which respectively show coordinates S of 20 points. The horizontal axis represents an in-phase (I) component, and the vertical axis represents an orthogonal (Q) component.

Further, outputs of the space-time block coding unit 106 at the second stage have the same signal arrangement, which may be a signal arrangement which does not include the origin.

Here, the coordinates of 20 points shown in FIGS. 5(a) and 5(b) can be expressed as coordinate equations as shown in FIG. 5(c).

FIG. 5(c) shows individually coordinate equations indicating the respective coordinates of 24 points, which illustrates coordinate equations which are re-expressed for each group. That is, in a case where the respective coordinates are divided into five groups on the basis of the distance from the origin or the phase, four coordinate equations (Nos. 1 to 4) relating to a first group may be converted into Formula 10, four coordinate equations (Nos. 5 to 8) relating to a second group may be converted into Formula 11, four coordinate equations (Nos. 9 to 12) relating to a third group may be converted into Formula 12, four coordinate equations (Nos. 13 to 16) relating to a fourth group may be converted into Formula 13, and four coordinate equations (Nos. 17 to 20) relating to a fifth group may be converted into Formula 14. In Formula 10 to Formula 14, k is an integer of 0 to 3. Further, in Formula 14, $\theta = \tan^{-1}(\frac{1}{2})$.

[Expression 16]

$$S = \frac{1}{\sqrt{6}} e^{j(k\pi/2)}$$ (Formula 10)

[Expression 17]

$$S = \frac{1}{\sqrt{3}} e^{j(2k+1)\pi/4}$$ (Formula 11)

[Expression 18]

$$S = \sqrt{\frac{2}{3}} e^{j(k\pi/2)}$$ (Formula 12)

[Expression 19]

$$S = \sqrt{\frac{5}{6}} e^{j(k\pi/2+\theta)}$$ (Formula 13)

[Expression 20]

$$S = \sqrt{\frac{5}{6}} e^{j(k\pi/2-\theta)}$$ (Formula 14)

Further, even when the operation using Formula 1 is performed for $X_{2t}$ and $X_{2t+1}$ given by Formula 2, in a case where any one of a combination of a value (coordinates of an arbitrary one point) given by Formula 10 and a value given by Formula 13 or Formula 14, a combination of a value given by Formula 11 and a value given by Formula 12, a combination of a value given by Formula 12 and a value given by Formula 11, and a combination of a value given by Formula 13 or Formula 14 and a value given by Formula 10 is used, as a combination of the initial values $S_{-2}$ and $S_{-1}$ the output signal arrangements of the differential encoding unit 10 are as shown in FIGS. 5(a) and 5(b), which are signal arrangements which do not include the origin. Here, Formula 9 corresponds to a combination of a case where k=0 in Formula 10 and a case where k=0 in Formula 13.

Further, outputs of the space-time block coding unit 106 at the second stage have the same signal arrangement, which may be a signal arrangement which does not include the origin.

As described above, in this example, in the radio transmitter of the DSTBC scheme which includes the input unit, the serial/parallel conversion unit 101, the symbol mapping unit 102, the initial value setting unit 103, the differential encoding unit 104, the delay unit 105, the space-time block coding unit 106, the transmission units 107-1 and 107-2, the power amplifiers 108-1 and 108-2, and the antenna units 109-1 and 109-2, the initial value setting unit 103 which gives the initial values to the differential encoding unit 104 is provided so that the output signal arrangement of the space-time block coding unit 106 does not include the origin (zero point).

In this way, in the transmitter using the DSTBC scheme in this example, the initial values of the DSTBC encoder (differential encoding unit 104 thereof) are set so that a state where a symbol is not present is realized at the origin of signal arrangement in the DSTBC encoder, and thus, the origin is not included in the signal arrangement. Thus, it is possible to reduce fluctuation in the envelope amplitude of the transmitted waveform. Accordingly, it is possible to alleviate the performance which is necessary for the power amplifiers 108-1 and 108-2.

Here, in this example, Formula 10 to Formula 14 are used in the initial value setting unit 103, but various operation formulas in which a state where a symbol is not present is realized at the origin of signal arrangement may be used.

Fourth Embodiment

A fourth embodiment of the invention will be described.

A configuration of a transmitter in this example is substantially the same as the configuration shown in FIG. 4 described in the third embodiment, and thus, its description will be made with reference to FIG. 4 for ease of description.

Here, the configuration or operation of the transmitter in this example is the same as the configuration or operation of the transmitter according to the third embodiment except that initial values set by the initial value setting unit 103 are different, for example. That is, in the transmitter in this example, configurations or operations of a serial/parallel conversion unit 101, a differential encoding unit 104, a delay unit 105, a space-time block coding unit 106, transmission units 107-1 and 107-2, power amplifiers 108-1 and 108-2, and antenna units 109-1 and 109-2 are the same as the configurations or operations of the corresponding functional units in the transmitter according to the third embodiment.

An example of the operation of the transmitter in this example will be described.

In this example, the initial value setting unit 103 which is different from that of the transmitter according to the third embodiment will be described in detail, and description about the same units will be simplified or omitted.

In the third embodiment, as initial values $S_{-2}$ and $S_{-1}$ output from the initial value setting unit 103, initial values given by Formula 10 to Formula 14 (for example, initial values given by Formula 9) are used, but initial values given by Formula 15 are used in this example.

[Expression 21]

$$\begin{bmatrix} S_{-2} \\ S_{-1} \end{bmatrix} = \frac{1}{\sqrt{3}} \begin{bmatrix} 1 \\ \frac{1}{\sqrt{2}} \end{bmatrix}$$ (Formula 15)

Figure 6:
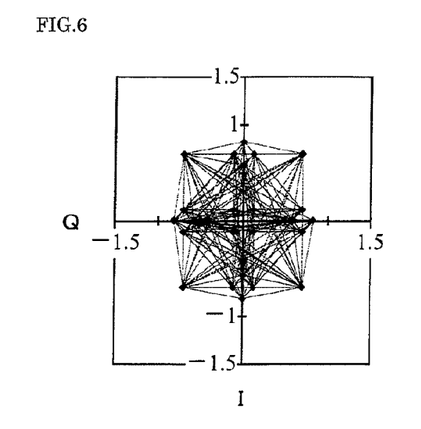
FIG. 6 is a diagram illustrating an example of the signal arrangement of a differential encoding unit.

When the initial values are given by Formula 15, output signal arrangement of the differential encoding unit 104 is as shown in FIG. 6, which is a signal arrangement which does not include the origin.

FIG. 6 shows an example of signal arrangement of differential encoding results $S_{2t}$ and $S_{2t+1}$. The horizontal axis represents an in-phase (I) component, and the vertical axis represents an orthogonal (Q) component.

Further, outputs of the space-time block coding unit 106 at the second stage have the same signal arrangement, which may be a signal arrangement which does not include the origin.

Figure 5:
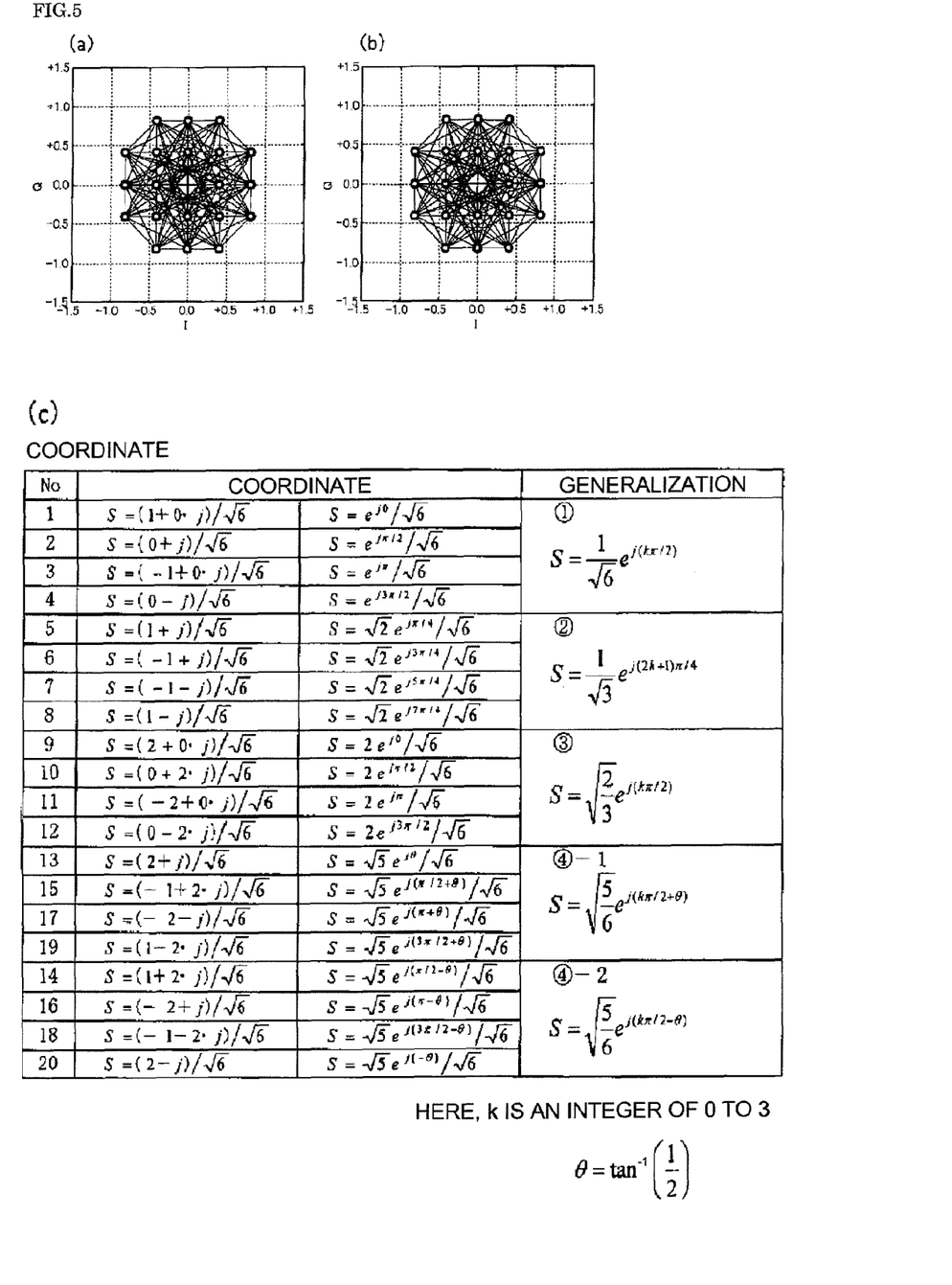
FIG. 5(a) is a diagram illustrating an example of the signal arrangement of a differential encoding unit with respect to 2 bits of the first half.
FIG. 5(b) is a diagram illustrating an example of the signal arrangement of a differential encoding unit with respect to 2 bits of the second half.
FIG. 5(c) is a diagram illustrating an example of a coordinate equation indicating the coordinates of each signal.

Among combinations in which a signal arrangement does not include the origin by changing the initial values, preferably, a pattern in which positions of respective symbols are equally distant as much as possible from the origin is selected. That is, in comparison of FIG. 5 shown in the third embodiment with FIG. 6 shown in the fourth embodiment, selection of FIG. 5 optimizes envelope fluctuation.

Conclusion of all Embodiments

Here, as an example of the radio communication system to which the invention may be applied, a train radio system which is a broadcast radio system will be schematically described.

In the train radio system, for example, a plurality of base station apparatuses is installed along a track, one central apparatus distributes (transmits) a data stream S which is a transmission target to each base station apparatus at the same time, and each base station apparatus transmits a data stream signal generated from the corresponding data stream S through an antenna in a wireless manner. Further, a mobile station of the train which travels on the track receives wireless signals (electric waves) from the base station apparatuses. Each base station apparatus includes two antennas including a directional antenna having different radio communication areas (which may be overlapped), for example.

In such a system, in the related art, when the system is managed by the plurality of base station apparatuses which uses the same frequency, radio wave interference occurs in the overlapped area in the communication areas (radio communication areas) of the adjacent base station apparatuses.

Thus, as a configuration example, in each base station apparatus, a technique is considered in which a transmission signal is encoded using the DSTBC, and a transmission data stream is selected or set for each antenna of each base station apparatus so that different encoded streams which are orthogonal to each other (for example, data streams A and B, which are orthogonal to each other, generated using the DSTBC scheme from the data stream S) are transmitted from each base station apparatus with respect to the overlapped area of the adjacent base station apparatuses, to thereby prevent the same wave interference.

Here, the system, apparatus or the like according to the invention is not necessarily limited to the above-described configuration, and may have various configurations. Further, the invention may be provided as a method or technique which performs the processes according to the invention, a program for realizing the method or technique, a recording medium which records the program, or the like. Further, the invention may be provided as various systems or apparatuses.

Further, the invention is not necessarily limited to the above-described application, and may be applied to various applications.

Further, in the various processes performed in the system, apparatus or the like according to the invention, for example, a configuration may be used in which control is performed as a processor executes a control program stored in a ROM (Read Only Memory), in a hardware resource including the processor, the memory and the like. Further, for example, the respective function means for performing the processes may be configured as independent hardware circuits.

Further, the invention may be understood as a computer-readable recording medium such as a Floppy (registered trademark) disc or a CD (Compact Disc) ROM which stores the control program, or the program (itself). Further, the processes according to the invention may be performed by inputting the control program into a computer from the recording medium to be executed by the processor.

| | Reference Signs List |
|---|---|
| 1, 101 | SERIAL/PARALLEL CONVERSION UNIT |
| 2-1, 2-2, 102 | SYMBOL MAPPING UNIT |
| 3, 103 | INITIAL VALUE SETTING UNIT |
| 4, 104 | DIFFERENTIAL ENCODING UNIT |
| 5, 105 | DELAY UNIT |
| 6, 106 | SPACE-TIME BLOCK CODING UNIT |
| 7-1, 7-2, 107-1, 107-2 | TRANSMISSION UNIT |
| 8-1, 8-2, 108-1, 108-2 | POWER AMPLIFIER |
| 9-1, 9-2, 109-1, 109-2 | ANTENNA UNIT |

The invention claimed is:

1. A transmitter which transmits a signal by a DSTBC scheme, comprising:
a first symbol mapping unit which maps a first bit stream divided from an input bit stream into a value on an IQ plane;
a second symbol mapping unit which maps a second bit stream divided from the input bit stream into a value on the IQ plane; and
a DSTBC encoder which performs DSTBC encoding for the mapping result in the first symbol mapping unit and the mapping result in the second symbol mapping unit,
wherein the DSTBC encoder includes a differential encoding unit which performs differential encoding for the mapping result in the first symbol mapping unit and the mapping result in the second symbol mapping unit, an initial value setting unit which sets the initial values of the differential encoding unit, and an STBC encoding unit which performs STBC encoding for the differential encoding result in the differential encoding unit,
wherein the first symbol mapping unit performs mapping using one of Formula 4 and Formula 5,
wherein the second symbol mapping unit performs mapping using the other of Formula 4 and Formula 5,
wherein the differential encoding unit performs differential encoding using Formula 1, and
wherein the initial value setting unit uses, as a combination of two initial values $S_{-2}$ and $S_{-1}$ in Formula 1, any combination in which the phase difference of two initial values is $n\pi/2$ (n is an integer) among a combination of a value given by Formula 6 and a value given by Formula 8, a combination of a value given by Formula 7 and a value given by Formula 7, and a combination of a value given by Formula 8 and a value given by Formula 6,

[Expression 1]

$$\begin{bmatrix} S_{2t} \\ S_{2t+1} \end{bmatrix} = \begin{bmatrix} S_{2t-2} & -S^*_{2t-1} \\ S_{2t-1} & s^*_{2t-2} \end{bmatrix} \begin{bmatrix} X_{2t} \\ X_{2t+1} \end{bmatrix} \quad \text{(Formula 1)}$$

[Expression 2]

$X_{2t}=\frac{1}{2}(1+j)$ when input bits correspond to the first pattern, $X_{2t}=\frac{1}{2}(-1+j)$ when input bits correspond to the second pattern, $X_{2t}=\frac{1}{2}(-1-j)$ when input bits correspond to the third pattern, and $X_{2t}=\frac{1}{2}(1j)$ when input bits correspond to the fourth pattern, (Formula 4)

[Expression 3]

$X_{2t+1}=1/\sqrt{2}$ when input bits correspond to the first pattern, $X_{2t+1}j1/\sqrt{2}$ when input bits correspond to the second pattern, $X_{2t+1}=-1/\sqrt{2}$ when input bits correspond to the third pattern, and $X_{2t+1}=-j\ 1/\sqrt{2}$ when input bits correspond to the fourth pattern, (Formula 5)

[Expression 4]

$S=\sin(\pi/8)e^{j(2k+1)\pi/8}$ (Formula 6)

[Expression 5]

$S=\sin(\pi/4)e^{jk\pi/4}$ (Formula 7)

[Expression 6]

$S=\sin(3\pi/8)e^{j(2k+1)\pi/8}$ (Formula 8)

where X represents the mapping result, S represents the differential encoding result, t represents a time series number which varies every two bits, and k represents an integer from 0 to 7.

2. A transmitter which transmits a signal by a DSTBC scheme, comprising:
a symbol mapping unit which maps a first bit stream and a second bit stream divided from an input bit stream into values on an IQ plane, respectively; and
a DSTBC encoder which performs DSTBC encoding for the mapping result in the symbol mapping unit,
wherein the DSTBC encoder includes a differential encoding unit which performs differential encoding for the mapping result in the symbol mapping unit, an initial value setting unit which sets the initial values of the differential encoding unit, and an STBC encoding unit which performs STBC encoding for the differential encoding result in the differential encoding unit, wherein the symbol mapping unit performs mapping using Formula 2, wherein the differential encoding unit performs differential encoding using Formula 1, and wherein the initial value setting unit uses, as a combination of two initial values $S_{-2}$ and $S_{-1}$ in Formula 1, any one of a combination of a value given by Formula 10 and a value given by Formula 13 or Formula 14, a combination of a value given by Formula 11 and a value given by Formula 12, a combination of a value given by Formula 12 and a value given by Formula 11, and a combination of a value given by Formula 13 or Formula 14 and a value given by Formula 10,

[Expression 7]

$$\begin{bmatrix} S_{2t} \\ S_{2t+1} \end{bmatrix} = \begin{bmatrix} S_{2t-2} & -S^*_{2t-1} \\ S_{2t-1} & s^*_{2t-2} \end{bmatrix} \begin{bmatrix} X_{2t} \\ X_{2t+1} \end{bmatrix} \quad \text{(Formula 1)}$$

[Expression 8]

$X=\frac{1}{2}(1+j)$ when input bits correspond to the first pattern, $X=\frac{1}{2}(-1+j)$ when input bits correspond to the second pattern, $X=\frac{1}{2}(-1-j)$ when input bits correspond to the third pattern, and $X=\frac{1}{2}(1-j)$ when input bits correspond to the fourth pattern, (Formula 2)

[Expression 9]

$$S = \frac{1}{\sqrt{6}} e^{j(k\pi/2)} \quad \text{(Formula 10)}$$

[Expression 10]

$$S = \frac{1}{\sqrt{3}} e^{j(2k+1)\pi/4} \quad \text{(Formula 11)}$$

[Expression 11]

$$S = \sqrt{\frac{2}{3}} e^{j(k\pi/2)} \quad \text{(Formula 12)}$$

[Expression 12]

$$S = \sqrt{\frac{5}{6}} e^{j(k\pi/2+\theta)} \quad \text{(Formula 13)}$$

[Expression 13]

$$S = \sqrt{\frac{5}{6}} e^{j(k\pi/2-\theta)} \quad \text{(Formula 14)}$$

where X represents the mapping result, S represents the differential encoding result, t represents a time series number which varies every two bits, k represents an integer from 0 to 3, and $\theta$ represents $\tan^{-1}(\frac{1}{2})$.

3. A transmitter which transmits a signal by a DSTBC scheme, the transmitter comprising:
a DSTBC encoder which performs DSTBC encoding,
wherein the DSTBC encoder includes a differential encoding unit having a condition given by Formula 18 and Formula 21,

[Expression 14]

$$\begin{bmatrix} S_{2t} \\ S_{2t+1} \end{bmatrix} = \frac{1}{\sqrt{2}} \begin{bmatrix} \alpha_{2t-2} e^{j(\theta_{2t}+\phi_{2t-2})} - \alpha_{2t-1} e^{j(\theta_{2t-1}-\phi_{2t-1})} \\ \alpha_{2t-1} e^{j(\theta_{2t}+\phi_{2t-1})} + \alpha_{2t-2} e^{j(\theta_{2t-1}-\phi_{2t-2})} \end{bmatrix} \quad \text{(Formula 18)}$$

[Expression 15]

$\alpha_{2t-2} - \alpha_{2t-1} \neq 0$ or $(\theta_{2t} + \phi_{2t-2}) - (\theta_{2t-1} - \phi_{2t-1}) \neq n\pi$ (n is an integer) (Formula 21)

where $\theta_i$ and $\phi_i$ represent real numbers indicating phases, and $\alpha_i$ represents a non-negative real number indicating amplitude.

4. A transmission method of transmitting a signal by a DSTBC scheme, comprising the steps of:
mapping a first bit stream divided from an input bit stream into a value on an IQ plane and mapping a second bit stream divided from the input bit stream into a value on the IQ plane; and
transmitting a result signal obtained by performing DSTBC encoding for the mapping result of the first bit stream and the mapping result of the second bit stream,
wherein the DSTBC encoding is performed using a differential encoding unit which performs differential encoding for the mapping result of the first bit stream and the mapping result of the second bit stream, an initial value setting unit which sets the initial values of the differential encoding unit, and an STBC encoding unit which performs STBC encoding for the differential encoding result in the differential encoding unit,
wherein the mapping of the first bit stream is performed using one of Formula 4 and Formula 5,
wherein the mapping of the second bit stream is performed using the other of Formula 4 and Formula 5,
wherein the differential encoding unit performs differential encoding using Formula 1, and
wherein the initial value setting unit uses, as a combination of two initial values $S_{-2}$ and $S_{-1}$ in Formula 1, any combination in which the phase difference of two initial values is $n\pi/2$ (n is an integer) among a combination of a value given by Formula 6 and a value given by Formula 8, a combination of a value given by Formula 7 and a value given by Formula 7, and a combination of a value given by Formula 8 and a value given by Formula 6,

[Expression 16]

$$\begin{bmatrix} S_{2t} \\ S_{2t+1} \end{bmatrix} = \begin{bmatrix} S_{2t-2} & -S^*_{2t-1} \\ S_{2t-1} & s^*_{2t-2} \end{bmatrix} \begin{bmatrix} X_{2t} \\ X_{2t+1} \end{bmatrix} \quad \text{(Formula 1)}$$

[Expression 17]

$X_{2t}=\frac{1}{2}(1+j)$ when input bits correspond to the first pattern, $X_{2t}=\frac{1}{2}(-1+j)$ when input bits correspond to the second pattern, $X_{2t}=\frac{1}{2}(-1-j)$ when input bits correspond to the third pattern, and $X_{2t}=\frac{1}{2}(1-j)$ when input bits correspond to the fourth pattern, (Formula 4)

[Expression 18]

$X_{2t+1}=1/\sqrt{2}$ when input bits correspond to the first pattern, $X_{2t+1}=j\,1/\sqrt{2}$ when input bits correspond to the second pattern, $X_{2t+1}=-1/\sqrt{2}$ when input bits correspond to the third pattern, and $X_{2t+1}=-j\,1/\sqrt{2}$ when input bits correspond to the fourth pattern, (Formula 5)

[Expression 19]

$S=\sin(\pi/8)e^{j(2k+1)\pi/8}$ (Formula 6)

[Expression 20]

$S=\sin(\pi/4)e^{jk\pi/4}$ (Formula 7)

[Expression 21]

$S=\sin(3\pi/8)e^{j(2k+1)\pi/8}$ (Formula 8)

where X represents the mapping result, S represents the differential encoding result, t represents a time series number which varies every two bits, and k represents an integer from 0 to 7.

5. A transmission method of transmitting a signal by a DSTBC scheme, comprising the steps of:
mapping a first bit stream and a second bit stream divided from an input bit stream into values on an IQ plane, respectively; and
transmitting a result signal obtained by performing DSTBC encoding for the mapping result of the first bit stream and the mapping result of the second bit stream,
wherein the DSTBC encoding is performed using a differential encoding unit which performs differential encoding for the mapping result of the first bit stream and the mapping result of the second bit stream, an initial value setting unit which sets the initial values of the differential encoding unit, and an STBC encoding unit which performs STBC encoding for the differential encoding result in the differential encoding unit,
wherein the mapping of the first bit stream and the second bit stream is performed using Formula 2,
wherein the differential encoding unit performs differential encoding using Formula 1, and
wherein the initial value setting unit uses, as a combination of two initial values $S_{-2}$ and $S_{-1}$ in Formula 1, any one of a combination of a value given by Formula 10 and a value given by Formula 13 or Formula 14, a combination of a value given by Formula 11 and a value given by Formula 12, a combination of a value given by Formula 12 and a value given by Formula 11, and a combination of a value given by Formula 13 or Formula 14 and a value given by Formula 10,

[Expression 22]

$$\begin{bmatrix} S_{2t} \\ S_{2t+1} \end{bmatrix} = \begin{bmatrix} S_{2t-2} & -S_{2t-1}^* \\ S_{2t-1} & S_{2t-2}^* \end{bmatrix} \begin{bmatrix} X_{2t} \\ X_{2t+1} \end{bmatrix}$$ (Formula 1)

[Expression 23]

$X=\frac{1}{2}(1+j)$ when input bits correspond to the first pattern, $X=\frac{1}{2}(-1+j)$ when input bits correspond to the second pattern, $X=\frac{1}{2}(-1-j)$ when input bits correspond to the third pattern, and $X=\frac{1}{2}(1-j)$ when input bits correspond to the fourth pattern, (Formula 2)

[Expression 24]

$$S = \frac{1}{\sqrt{6}} e^{j(k\pi/2)}$$ (Formula 10)

[Expression 25]

$$S = \frac{1}{\sqrt{3}} e^{j(2k+1)\pi/4}$$ (Formula 11)

[Expression 26]

$$S = \sqrt{\frac{2}{3}} e^{j(k\pi/2)}$$ (Formula 12)

[Expression 27]

$$S = \sqrt{\frac{5}{6}} e^{j(k\pi/2+\theta)}$$ (Formula 13)

[Expression 28]

$$S = \sqrt{\frac{5}{6}} e^{j(k\pi/2-\theta)}$$ (Formula 14)

where X represents the mapping result, S represents the differential encoding result, t represents a time series number which varies every two bits, k represents an integer from 0 to 3, and θ represents $\tan^{-1}(\frac{1}{2})$.

6. A transmission method of transmitting a signal by a DSTBC scheme,
wherein the transmitter includes a DSTBC encoder which performs DSTBC encoding,
wherein the DSTBC encoder performs differential encoding under a condition given by Formula 18 and Formula 21,

[Expression 29]

$$\begin{bmatrix} S_{2t} \\ S_{2t+1} \end{bmatrix} = \frac{1}{\sqrt{2}} \begin{bmatrix} \alpha_{2t-2} e^{j(\theta_{2t}+\phi_{2t-2})} - \alpha_{2t-1} e^{j(\theta_{2t-1}-\phi_{2t-1})} \\ \alpha_{2t-1} e^{j(\theta_{2t}+\phi_{2t-1})} + \alpha_{2t-2} e^{j(\theta_{2t-1}-\phi_{2t-2})} \end{bmatrix}$$ (Formula 18)

[Expression 30]

$$\alpha_{2t-2}-\alpha_{2t-1} \neq 0 \text{ or } (\theta_{2t}+\phi_{2t-2})-(\theta_{2t-1}-\phi_{2t-1}) \neq n\pi \text{ (}n\text{ is an integer)} \quad \text{(Formula 21)}$$

where $\theta_i$ and $\theta_j$ represent real numbers indicating phases, and $\alpha_i$ represents a non-negative real number indicating amplitude.

* * * * *